United States Patent [19]

Kofink et al.

[11] 4,010,895
[45] Mar. 8, 1977

[54] SYSTEM FOR PREHEATING A WATER-COOLED VEHICLE ENGINE AND FOR HEATING THE INTERIOR OF THE VEHICLE

[75] Inventors: Siegfried Kofink; Wolfgang Rich, both of Esslingen; Herbert Langen, Altbach, all of Germany

[73] Assignee: J. Eberspacher, Esslingen (Neckar), Germany

[22] Filed: Nov. 20, 1974

[21] Appl. No.: 525,576

[52] U.S. Cl. .......................................... 237/12.3 C
[51] Int. Cl.² .......................................... B60H 1/02
[58] Field of Search ............... 237/12.3 C, 12.3 B, 237/8 A

[56] References Cited
UNITED STATES PATENTS

| | | | |
|---|---|---|---|
| 3,131,864 | 5/1964 | Young | 237/8 A |
| 3,877,639 | 4/1975 | Wilson et al. | 237/12.3 C |

*Primary Examiner*—William E. Wayner
*Attorney, Agent, or Firm*—Toren, McGeady and Stanger

[57] ABSTRACT

In the cooling system of a water-cooled engine for a vehicle, a heat exchanger is arranged for heating the interior of the vehicle using the heat extracted from the water which cools the engine. To provide rapid heating of the interior of the vehicle and preheating of the engine, a heating system is incorporated into the cooling system for selectively heating a portion of the cooling water to a desired temperature and then passing the heated water into the heat exchanger for heating the interior of the vehicle. After flowing through the heat exchanger, the heated water is passed through the water-cooled engine to preheat it.

7 Claims, 2 Drawing Figures

SYSTEM FOR PREHEATING A WATER-COOLED VEHICLE ENGINE AND FOR HEATING THE INTERIOR OF THE VEHICLE

SUMMARY OF THE INVENTION

The present invention is directed to the cooling system used with a water-cooled engine which includes a heat exchanger for heating the interior of the vehicle and, more particularly, it is directed to a method of and apparatus for effecting the rapid heating of the interior of the vehicle and also for preheating the water-cooled engine.

In the present invention, an auxiliary system is incorporated into the cooling system and includes a heating device separate from the engine which utilizes liquid fuel as a source of heat, a heat exchanger directly connected to the heating device and a thermostat and a T-shaped connector piece both arranged to connect the heating device and heat exchanger into the cooling system.

It is well known in the art to provide heating devices into vehicles to effect the heating of the interior of the vehicle. Such heating devices or arrangements provide a separate source of heat for the interior of the vehicle independent from the heat provided by the vehicle motor or engine. Separate sources of heat are used because the vehicle motor or engine requires a long period of time to generate an amount of heat which is sufficient for heating the vehicle interior. With regard to the engine, the primary consideration is that it reaches the necessary operating temperature. In providing heat for the interior of a vehicle, a clear distinction has to be made between vehicles employing air-cooled engines and those using water-cooled engines. When air-cooled engines are involved, the heating effect available from the engine for heating the interior of the vehicle is, as is generally known, quite insignificant and the actual amount of available heat is dependent upon the operating conditions of the motor. As a result, vehicles with air-cooled engines preferably use an additional heating device which generates the heat employed in the vehicle interior. Such heating systems are well known in the art and in certain instances are provided as standard equipment in vehicles with air-cooled motors.

By contrast, in vehicles powered by water-cooled engines, there is the significant disadvantage that, at the startup, an extended period of time is needed to reach the operating temperature for the engine and, only after the operating temperature has been reached, can heat be supplied to the interior of the vehicle, for example, for de-icing the windshield or windows of the vehicle. As a result, the heat for the interior of the vehicle is available only after a relatively long period of operation following engine startup.

It is the primary object of the present invention to provide a method for rapidly preheating a water-cooled vehicle engine and for rapidly heating the interior of the vehicle powered by such an engine. Employing the concept of the present invention, the vehicle engine can be heated at a significantly faster rate so that the known disadvantages of "cold startup" of the engine is avoided and, at the same time, the interior of the vehicle can also be heated as quickly as possible so that, in particular, the de-icing of the windshield can be effected rapidly.

In accordance with the present invention, initially, a portion of the water used in the cooling system is heated in a heating device which is independent from the vehicle engine and, after the water temperature has reached at least 60° C, it is supplied to the heat exchanger which warms the interior of the vehicle. Accordingly, pursuant is the inventive procedure, the heating device first heats that portion of the cooling liquid it contains. At the same time, the fan or blower associated with the heat exchanger for the interior of the vehicle is rotated at a low speed. After the predetermined temperature has been reached, it is normally attained within about 2 minutes, a thermostat associated with the heating device opens so that the heated portion of the cooling liquid at the predetermined temperature of about 60° C can flow into the heat exchanger for the vehicle interior. In the heat exchanger, with air being supplied by a blower or fan, a portion of the heat energy is extracted from the heated liquid increasing the temperature of the air which is then directed through nozzles or openings in the vehicle dashboard against the cold windshield and into the interior of the vehicle. After its passage through the heat exchanger, the heated liquid continues on through the cooling system through a water pump into the engine block.

Experiments have indicated that after about half an hour the temperature in the interior space of the vehicle is increased by about 20° C while in the engine block it is increased by about twice that amount. In this manner the preheating of the engine is achieved and it occurs at such a rate that the engine can be started in a warm condition. Moreover, even before the vehicle engine is started up, the interior of the vehicle can be heated. In carrying out the present invention, a thermostat is positioned between the cooling system outlet from the vehicle engine and the heating device and a T-shaped junction piece is located in the cooling system downstream of the thermostat and upstream from the vehicle heat exchanger. The heating device includes a heat exchanger in which the cooling liquid is heated and flows back into the cooling system through the T-shaped junction piece. The portion of the cooling system extending between the thermostat and the T-shaped piece is arranged to afford a bypass line or conduit which, in combination with the heat device, provides a separate circuit within the cooling system. With this inventive arrangement, while employing a minimum number of additional parts, a combination with the heating system for the vehicle is possible. Due to the arrangement of the thermostat in the cooling system between the outlet from the engine and the inlet to the heating device, it is possible to heat the interior of a vehicle without the heating device solely by means of the cooling water flowing through the vehicle engine, since, at predetermined temperatures, the thermostat will rapidly open providing the requisite flow, and temperature losses in the heating device by radiation will not have any influence on the thermostat. Due to the arrangement of its own closed circuit within the cooling system, the thermostat will permit the flow of the cooling water or liquid through the heating device only for such a period as is required to reach the predetermined relatively high temperature required. Subsequently, the flow from the heating device to the vehicle heat exchanger is open and the complete heating effect of the device is available using water of a relatively high temperature, and the amount of water used being adjusted to the high water temperature by the thermostat.

Another feature of the invention is that the thermostat is provided with a leakage bore on the side which is normally closed under cold conditions. As a result, an amount of leakage is provided to the entire heating arrangement so that a flow is provided through the valve of the heater's thermostat when the system is in its cold or closed condition. As a result, the heating of the thermostat by the engine cooling water occurs in a more favorable manner and, in turn, leads to a shortening of the time required to open the thermostat though a built-in thermostat is used and there is no delay in the heating time of the vehicle heat exchanger.

Still another feature of the present invention is the provision of means, in communication with the thermostat, for switching on and off fans or blowers used in the vehicle heating system. Accordingly, it is possible in a very simple manner to effect the distribution of heat to the interior space of the vehicle independently of the temperature which is measured at the thermostat. Another advantageous feature of the inventive arrangement is the incorporation of the thermostat and the T-shaped junction piece into a single unit. In such an arrangement an additional line or conduit as well as a separate T-shaped piece is made unnecessary and a single structural unit can be used. Such a structural unit can be readily and inexpensively produced and also can be quickly and inexpensively replaced if it should become necessary to do so.

BRIEF DESCRIPTION OF THE DRAWING

The drawing in FIG. 1 displays a schematic showing of a cooling system for a water-cooled vehicle, including a heat exchanger for heating the vehicle interior, embodying the present invention.

DETAILED DESCRIPTION OF THE INVENTION

Figure 1:
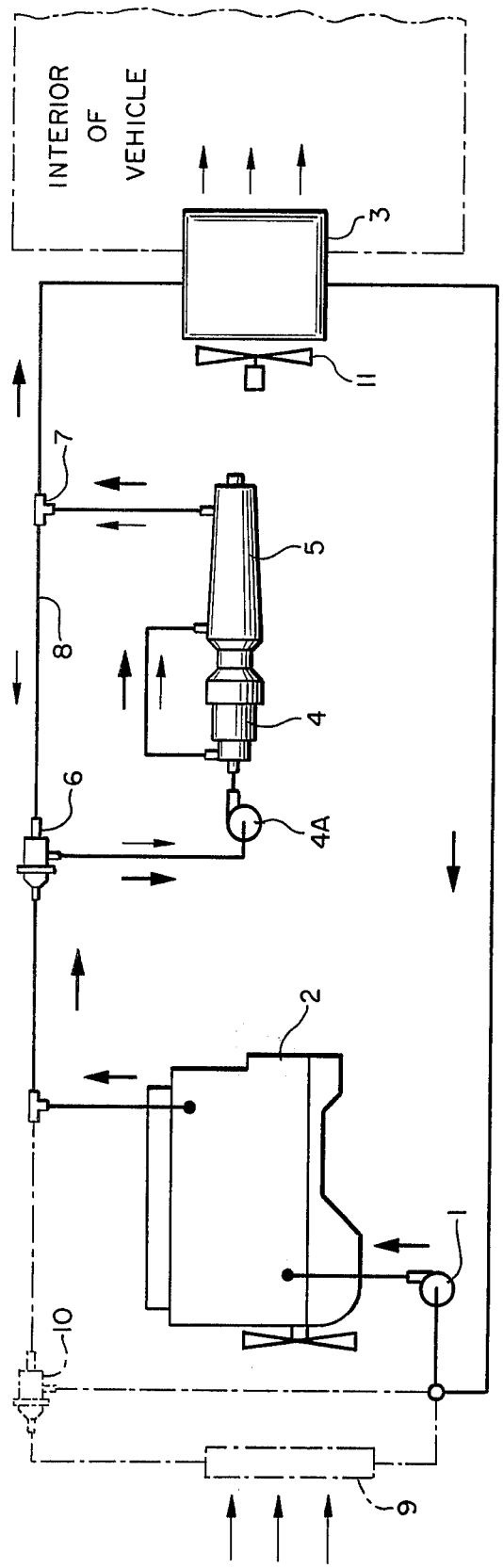

In FIG. 1, the flow scheme in the cooling system for a water-cooled vehicle engine is shown and the cooling system includes a flow circuit F which forms a part of the vehicle. Incorporated into the flow circuit is a water pump 1, a water-cooled vehicle engine 2 and water-air heat exchanger 3 which supplies the heat for the interior of the vehicle. In addition, shown in dot-dash lines is vehicle cooler or radiator 9 and a thermostat 10 associated with it. In known water-cooled vehicle engine systems, the engine 2 is supplied with cooling water by the pump 1. Upon engine startup, the engine generates heat which is absorbed by the cooling water and circulated from the engine through the thermostat 10 and radiator 9 back to the water pump to provide a complete and closed cycle. In this known water-cooled vehicle engine cooling system, the inventive concept involves the use of a heating device 4 joined to the flow circuit F by an inlet branch connection A and an outlet branch connection B. The heating device 4 is provided in the form of a structural unit including a heat exchanger 5. Heat generated within the heating device 4 by the use of a liquid fuel is transferred in the heat exchanger 5 into the water in the cooling system or flow circuit.

At the junction of the inlet branch connection A with the flow circuit F, a thermostat 6 is provided while at the junction of the outlet branch connection B with the flow circuit F, a T-shaped connector piece 7 is arranged. As shown in FIG. 1, the T-shaped connector piece 7 is connected to the thermostat 6 by a conduit connection 8. As a result, the heating device is provided with a closed circuit formed as a part of the overall flow circuit and including the thermostat 6, the branch connection A, the heating device 4 including the heat exchanger 5, the branch connection B, the T-shaped connector piece 7 and the line 8. A water pump 4A is associated with the heating device for circulating that portion of the cooling water through the enclosed auxiliary circuit containing the heating device. Further, though not shown, the heating gas of the heating device 4 is discharged through an exhaust line. As can be appreciated, the thermostat 6 provides the coupling or connection of the heating device circuit to the overall flow circuit F.

Figure 2:
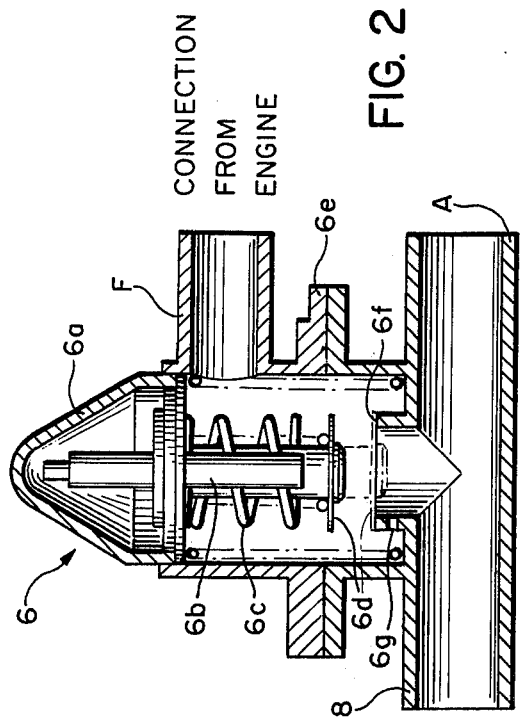
FIG. 2 is a cross-sectional view of a thermostat used in the cooling system of FIG. 1.

In FIG. 2 the thermostat 6 includes a housing 6a containing an expansion member 6b held in place by a spring 6c. A disc 6d is mounted on one end of the expansion member 6b which is shown in full lines in the open position and in dashed lines in the closed position. A flange 6e connects the housing 6a to the opening 6f into the conduit system consisting of the line 8 and the inlet branch connection A. To provide an amount of leakage into branch connection A when the disc 6d is in the closed condition a leakage bore 6f permits flow around the disc.

The T-shaped piece 7 can be combined with the thermostat 6 as a single structural unit for simplifying the structure within the flow system.

Downstream of the T-shaped piece 7, that is, between the piece 7 and the water pump 1, the heat exchanger 3 for the interior of the vehicle is located and a fan 11 is associated with the heat exchanger. Though not shown, to afford a clear picture of the connection of the heating device into the cooling system or flow circuit F, means are associated with the thermostat 6 for switching on and off the fan 11 which circulates air to the heat exchanger 3 so that the air removes heat from the circulating cooling water for heating the interior or the vehicle.

Though the thermostat 6 is closed under cold conditions of the cooling system so that there is no circulation, the leakage bore 6F is provided in the thermostat to afford flow when the heating device 4 is being used to heat a portion of the cooling water for use in rapid heating of the rapid heating of the interior of the vehicle and rapid preheating of the engine 2.

If the engine 2 is cold and it is desired to heat the interior of the vehicle or to de-ice the vehicle windshield and windows, or to preheat the engine, the liquid fuel in the heating device 4 can be ignited to provide heating gases which heat water from the cooling system which is located in the heat exchanger 5. The circulation of the portion of the cooling water within the auxiliary closed circuit including the heating device 4 is continued until it reaches at least 60° C at which time the thermostat 6 opens the path of flow to the heat exchanger 3. Prior to that time the fan 11 has been started up and as the heated water flows through the heat exchanger 3, its heat is transferred to the air from the fan 11 which flows into the interior of the vessel. After the heated water was circulated through the heat exchanger, it continues on through the flow circuit F into the water pump 1 which circulates it through the engine 2 providing preheating of the engine.

Before normal operating flow commences, when the thermostat 6 is open so that flow is directed through it from the engine 2, there is a small flow through the leakage bore 6g of the thermostat 6 from the flow circuit F into the inlet branch connection A. This leakage flow bypasses the disc 6d which closes the opening 6f. When the heating device 4 and heat exchanger 5 are started by the bypass flow will be effected through the inlet branch connection A, the pump 4A, the heating device 4 and heat exchanger 5, into the outlet branch connection B and through the connector piece 7 to the conduit connection 8. When pump 1 and engine 2 are operating, but before normal operating flow through the thermostat 6 is commenced, the small amount of leakage through the thermostat, with the heating device 4, the pump 4A and the heat exchanger 5 operating, will flow in the direction from inlet branch connection A to outlet branch connection B into the connector piece 7 and the connector piece is arranged for flow in both directions, that is, into the conduit connection and toward the heat exchanger 3. This small amount of flow through the heat exchanger 3 can be used to provide heat for the vehicle until normal operating temperatures are reached in the engine when the heat from the engine is used for vehicle heat.

What is claimed is:

1. A system, for use in a vehicle propelled by a water cooled engine, for cooling the water cooled engine and for heating the interior of the vehicle, comprising a closed conduit system for circulating a cooling liquid, said water-cooled engine having an inlet and an outlet each connected to said conduit system so that the cooling liquid can flow through said engine, a first heat exchanger having an inlet and an outlet each connected to said conduit system for flow of the cooling liquid therethrough and said first heat exchanger arranged to transfer heat from the cooling liquid flowing in the cooling system so that the heat can be used subsequently in heating the interior of a vehicle, a thermostat positioned in said conduit system between the outlet from said engine and the inlet into said first heat exchanger with said thermostat arranged for selectively blocking flow through said conduit system, a T-shaped piece connected to said conduit system between said thermostat and the inlet to said first heat exchanger, said thermostat arranged for selectively blocking flow through said conduit system, a heating device including a second heat exchanger, a first branch conduit extending between said thermostat and said heating device and a second branch conduit extending between said second heat exchanger and said T-shaped piece with said thermostat and said T-shaped piece arranged to form a branch conduit including the first branch connection, the heating device including the second heat exchanger, the second branch connection, the portion of said conduit system extending between said thermostat and said T-shaped piece, with said thermostat and T-shaped piece arranged to direct flow through branch conduit separate from the remainder of said conduit system containing said engine and said first heat exchanger so that cooling liquid flowing through said branch conduit can be heated until a selected temperature is reached and then by arranging said thermostat and T-shaped piece flow of the heated cooling liquid can be directed through said conduit system for flow through the first heat exchanger and through said water cooled engine.

2. A system, as set forth in claim 1, wherein means are arranged for flowing air through said first exchanger, and means associated with said thermostat for switching on and off said means for flowing air.

3. A system, as set forth in claim 1, wherein said thermostat and said T-shaped piece form a unit located in said conduit system.

4. A system, as set forth in claim 1, wherein a water pump is located in said conduit system between said first heat exchanger and the inlet into said engine for circulating the cooling liquid through said engine and said conduit system.

5. A system, as set forth in claim 1, wherein said thermostat has a leakage bore therein associated with said branch conduit for providing flow through said thermostat into said branch conduit until a predetermined temperature is reached when the cooling liquid flowing in said conduit system is being heated in said water cooled engine.

6. A method of rapidly preheating the engine in a motor vehicle having a water-cooled engine located in a closed conduit system including a heater for supplying heat into the interior space of the vehicle comprising the steps of heating and circulating a portion of the water used in the closed conduit system in a branch conduit connected to the closed conduit system with the branch conduit controllably separable from the portion of the closed conduit system containing the water-cooled engine and the heater for the interior of the vehicle so that the flow of water can be retained in the branch conduit, using a liquid fuel in the branch conduit as a source of heat and raising the temperature of the water within the branch conduit to a temperature of at least 60° C, when the water has been heated to at least 60° C flowing the water in the branch conduit to the heater in the closed conduit system for use in heating the interior space of the vehicle.

7. A method, as set forth in claim 6, comprising the further step of circulating the heated water from the bypass conduit through the water cooled engine after it has passed through the heater.

* * * * *